US006704659B1

United States Patent
Lee et al.

(12) United States Patent
(10) Patent No.: US 6,704,659 B1
(45) Date of Patent: Mar. 9, 2004

(54) SEISMIC EMERGENCY RESPONSE SYSTEM FOR USE IN A WAFER FABRICATION PLANT

(75) Inventors: Yuk-Tong Lee, Fengshan (TW); Hsing-Hung Lee, Chiai (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/218,719

(22) Filed: Aug. 14, 2002

(51) Int. Cl.[7] .............................................. G06F 19/00
(52) U.S. Cl. ....................................................... 702/15
(58) Field of Search ........................... 702/15; 706/929; 187/278; 307/117, 121, 122; 340/690, 669, 540; 376/217

(56) References Cited

U.S. PATENT DOCUMENTS 4,619,751 A * 10/1986 Robinson ................. 204/288.1
4,649,751 A * 3/1987 Onoda et al. ................. 73/658
5,490,062 A * 2/1996 Leach et al. ................... 702/15
5,742,235 A * 4/1998 Miche ........................ 340/690

* cited by examiner

Primary Examiner—Donald E. McElheny, Jr.
(74) Attorney, Agent, or Firm—Tung & Associates

(57) ABSTRACT

In general, the present invention provides a seismic emergency response system (SERS) to control fabrication equipment and material flow for prevention of damage to wafers and equipment within a wafer fabrication plant during an earthquake. The SERS having a facility manager control system having one or a plurality of seismic detection devices, and at least one voting logic device for outputting an alarm triggering signal to a computer integrated manufacturing system; and a computer integrated manufacturing system having an emergency response system and an equipment server (tool application program) for sending a pause equipment command to an associated piece of equipment and a hold lot command to a material execution system to prevent damage of wafers during an earthquake. Optionally provided is one or a plurality of false alarm prevention devices and one or a plurality of enabling switches provided to selectively enable or disable the SERS.

20 Claims, 3 Drawing Sheets

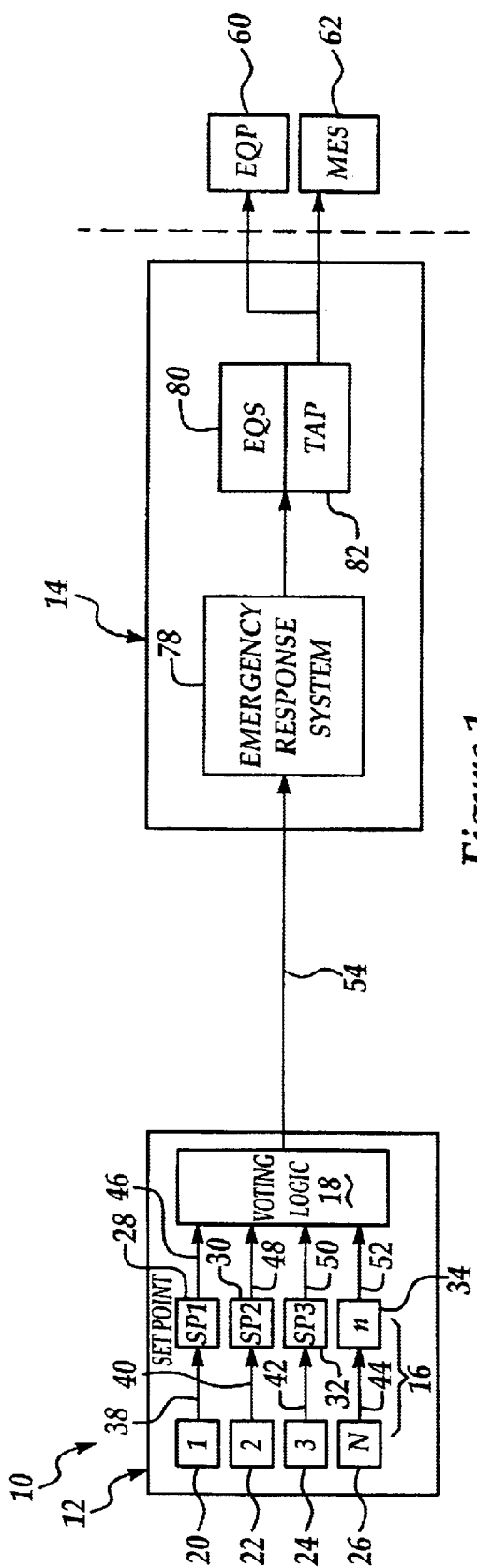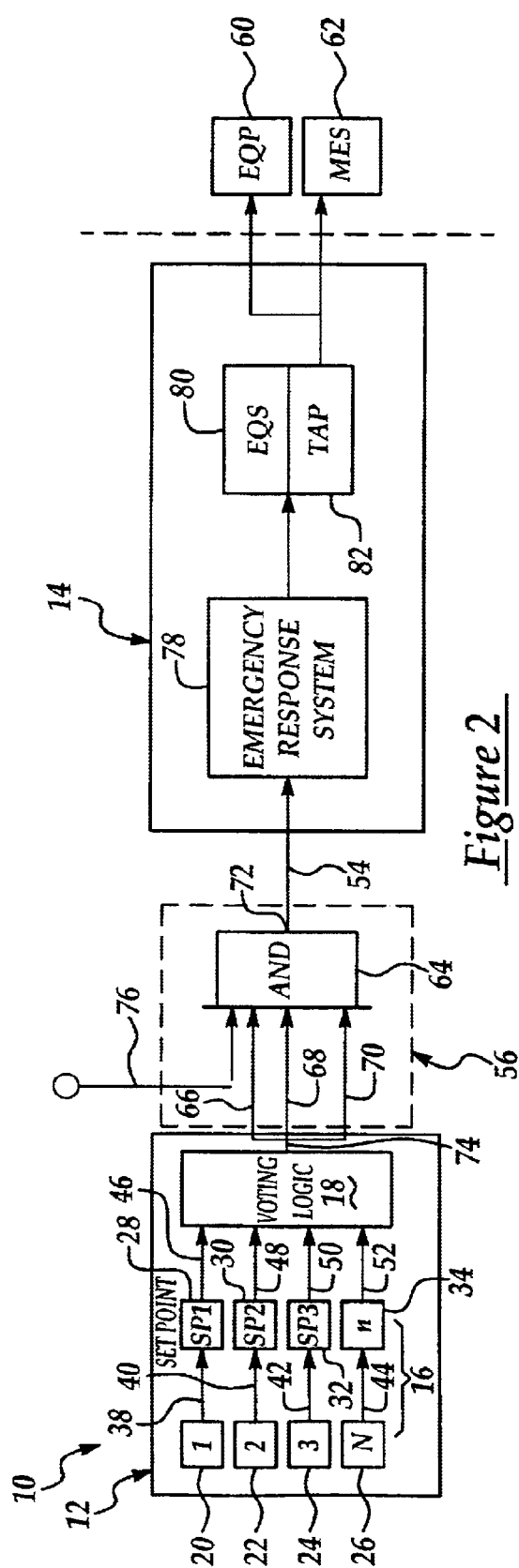

SEISMIC EMERGENCY RESPONSE SYSTEM FOR USE IN A WAFER FABRICATION PLANT

FIELD OF THE INVENTION

The present invention is directed to a seismic emergency response system for preventing damage to equipment and wafers within a wafer fabrication FAB during an earthquake.

BACKGROUND

Earthquakes can severely impact wafer fabrication plants by wasting time and expenses to recover lost production and fabrication operations. During an earthquake, a FAB will typically continue to operate using a live power source and as a result of oscillations or seismic occurrences caused by the earthquake, fabrication equipment can be damaged and wafer surfaces are scratched or scraped by the damaged equipment. Often, information concerning a lot being run during an earthquake is lot.

Therefore, it is desirable to provide a system that can reduce an impact of an earthquake by stopping equipment operations and material flow upon occurrence of an earthquake.

It is further desirable to provide lot information regarding lots run during an earthquake.

It is further desirable to protect fabrication equipment's operating mechanism when an earthquake happens.

It is further desirable to reduce the number of wafers requiring scrapping when an earthquake occurs.

It is further desirable to provide a hold lot function to collect statistics resulting from earthquake impacted lots, and to help an engineer quickly recover from an earthquake occurrence by logging information regarding lots being fabricated in the fab, for example lots disposed within fabrication equipment and lots within a bay.

SUMMARY OF THE INVENTION

In general, the present invention provides a seismic emergency response system having a facility manager control system and a computer integrated manufacturing system that cooperate to control fabrication equipment and material flow for prevention of damage to wafers and equipment within a wafer fabrication plant during an earthquake.

The facility manager control system has a seismic detection device for detecting seismic activity, a voting logic device for inputting signals from the seismic detection device and outputting an alarm triggering signal to a computer integrated manufacturing system.

The computer integrated manufacturing system has an emergency response system and an equipment server (tool application program), wherein the emergency response system receives the alarm triggering signal output from the voting logic device, and communicates with the equipment server (tool application program) to send a pause equipment command to an associated piece of equipment and a hold lot command to a material execution system to prevent damage of wafers during an earthquake.

Preferably, the seismic emergency response system provides a false alarm signal prevention device to prevent against communication failure between the voting logic device and the CIM system and an emergency response center having an enabling switch to prevent the SERS from disabling pieces of fabrication equipment and from disabling the MES system according to instructions received by the emergency response center.

Additionally provided is an alternative embodiment of the seismic emergency response system that prevents damaging fabrication equipment and a material execution system associated with a particular Richter scale level. The alternative embodiment provides a FMCS having a plurality of seismic detection devices for detecting seismic activity, and at least one voting logic device for inputting signals from the plurality of seismometer groups and outputting a plurality of associated alarm triggering signals to a CIM system; and a computer integrated manufacturing system for receiving the plurality of associated alarm triggering signals output from the at least one voting logic device, wherein the FMCS and the CIM system cooperate to control fabrication equipment and material flow within a wafer fabrication plant during an earthquake.

BRIEF DESCRIPTION OF THE DRAWINGS

These and other objects, features and advantages of the present invention will become apparent from the following detailed description and the appended drawings in which:

FIG. 1 is a schematic illustrating a seismic emergency response system in accordance with one embodiment of the present invention.

FIG. 2 is a schematic illustrating a seismic emergency response system having a false alarm signal prevention device in accordance with one embodiment of the present invention.

DETAILED DESCRIPTION OF THE PREFERRED EMBODIMENTS

Figure 3:
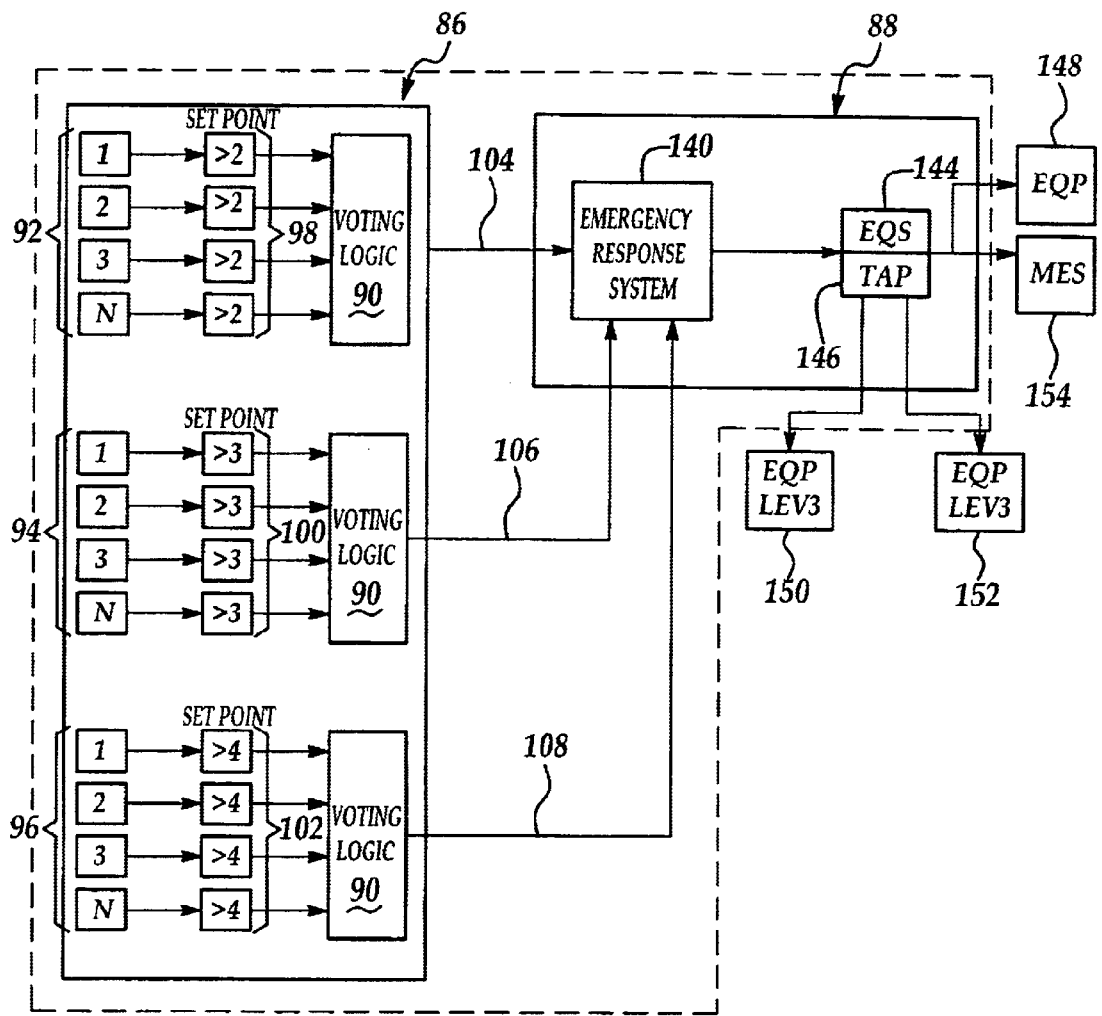
FIG. 3 is a schematic illustrating a seismic emergency response system having a plurality of seismic detection devices for detecting different magnitudes of earthquakes in accordance with one embodiment of the present invention.

The present invention provides a seismic emergency response system (hereinafter "SERS) that combines two powerful control systems, a facility manager control system (hereinafter "FMCS") and a computer integrated manufacturing (hereinafter "CIM") system cooperating within a wafer fabrication plant to protect fabrication equipment and wafer lots from being damaged during an earthquake. The FMCS provides a seismic signal detection device for detecting a seismic occurrence, and a voting logic device for communicating an alarm triggering signal to the CIM system. In one embodiment of the invention, the SERC of the present invention provides the capability to pause pieces of fabrication equipment and put wafer lots on hold lot according to different earthquake levels detected.

The SERS having the capability of recording lot information into a system log using an equipment server tool application program to determine location and status of paused or held lots during an earthquake. The system log provides information such as indicated lots disposed within equipment, and within bays that can help a fabrication engineer to recover quickly from an earthquake occurrence.

As shown in FIG. 1, a SERS 10 is provided, the SERS 10 has a FMCS 12 and a CIM system 14. The FMCS 12 provides a seismic detection device 16 and a voting logic device 18.

The seismic detection device 16 is preferably a plurality of seismometers 20, 22, 24, 26 up to N number of seismometers for measuring a magnitude of an earthquake, and a plurality of set point devices 28, 30, 32, 34 associated with the N number of seismometers 20, 22, 24, 26 for determining whether output signals communicated from each associated seismometer 20, 22, 24, 26 exceed a threshold value.

While seismometers 20, 22, 24, 26 are shown in FIG. 1 in combination with set point devices 28, 30, 32, 34 it is contemplated that other seismic detection devices (not shown) may be used in accordance with the function of the present invention to communicate seismic information to a wafer fabrication CIM system in order to control fabrication equipment and material flow within a wafer fabrication process during an earthquake.

Each seismometer 20, 22, 24, 26 receives seismic input signals 36 (not shown). indicating magnitudes of an earthquake and communicates magnitude value output signals 38, 40, 42, 44 to each seismometer's associated set point device, and wherein each associated set point device determines whether the magnitude value output signals 38, 40, 42, 44 of an associated seismometer exceed a threshold value. Each threshold value is equal to a magnitude value of an earthquake, preferably measured according to a Richter scale, wherein 1 is the lowest magnitude of an earthquake, and 9 typically, is the highest magnitude of an earthquake. However, another earthquake magnitude or intensity scale could optionally be used.

The set point devices 38, 30, 32, 34 preferably are calibrated to have the same threshold value, wherein when the threshold value for each of the set point devices is exceeded, a signal 46, 48, 50, 52 representing assertion of the set point device is sent to the voting logic device 18 indicating an earthquake having a Richter scale magnitude at least greater than the threshold value has occurred. Each set point device 28, 30, 32, 34 could be disposed within each associated seismometer 20, 22, 24, 26 or could be disposed within the FMCS 12, wherein each set point device 28, 30, 32, 34 is in communication with each associated seismometer 20, 22, 24, 26 at a location apart from the seismometer.

The voting logic device 18 inputs signals from the plurality of seismometers 20, 22, 24, 26 and outputs an alarm triggering signal 54 to the CIM system 14. The FMCS 12 collects the seismometer magnitude value output signals 38, 40, 42, 44 from the plurality of seismometers 20, 22, 24, 26, and communicates the magnitude value output signals 38, 40, 42, 44 through the voting logic device 18 to output an alarm triggering signal 54 which is then communicated to the CIM system 14.

The voting logic device 18 prevents against a seismometer failure by determining that at least three set point device threshold values associated with each set point device 28, 30, 32, 34 have been exceeded. The voting logic device 18 then communicates the alarm triggering signal 54 to the CIM system 14, the alarm triggering signal 54 associated with the at least three set point devices 28, 30, 32, 34 asserts the occurrence of an earthquake of a magnitude greater than the calibrated threshold value to the CIM system 14 if a seismometer failure has not occurred.

As shown in FIG. 1, illustrating a preferred embodiment of the present invention, at least three seisometers 20, 22, 24 are provided, wherein each seismometer has an associated three set point devices 28, 30, 32 in communication with the voting device 18.

optionally, as shown in FIG. 2, the SERS 10 further provides a false alarm signal prevention device 56 to prevent against communication failure between the voting logic device 18 and the CIM system 14, and an emergency response center (ERC) 58 (not shown) to prevent the SERS 10 from disabling at least one piece of fabrication equipment 60 and an MES system 62.

In operation, the false alarm signal prevention device 56 has an associated AND gate 64, the AND gate 64 having preferably, three redundant signal inputs 66, 68, 70 for receiving three redundant signal inputs 66, 68, 70 communicated from the associated alarm triggering signal 54 of the voting logic device 18 and one output 72 for further communicating the associated alarm triggering signal 54 to the CIM system 14 when all three redundant signal inputs 66, 68, 70 are asserted, and wherein when one of the three redundant signal inputs 66, 68, 70 is not asserted, no alarm triggering signal 54 will be sent to the CIM system. 14

Each of the three redundant signal inputs 66, 68, 70 associated with the alarm triggering signal 54 of the voting logic device 18 cooperate with the associated AND gate 64 to provide a false alarm signal prevention device 56 for preventing against communication failure between the voting logic device 18 and the CIM system 14.

Preferably, during a normal operating state wherein no earthquake is detected, if at least one of the three redundant signal inputs 66, 68, 70 is off, and thus, not asserted, then no earthquake alarm will be communicated to the CIM system 14. However, upon occurrence of an earthquake exceeding a threshold value for each of the plurality of set point devices associated with the plurality of seismometers an alarm is signaled to the CIM system providing that each of the three redundant signal inputs 66, 68, 70 are on or are asserted.

The emergency response center 58 has an enabling switch 76 capable of enabling or disabling the SERS 10 in accordance with instructions received from the ERC 58. The enabling switch 76 is used by the ERC 58 to enable or disable the SERS 10 by overriding the alarm triggering signal 54 from the voting logic device 18. The enabling switch 76 communicates an on or an off signal to the AND gate 64 of the false alarm signal prevention device 56 and disables the SERS 10 if an off signal is communicated to the AND gate 64. If an on signal is communicated to the AND gate 64 and each of the three redundant signal inputs 66, 68, 70 are asserted, then the alarm triggering signal 54 is communicated to the CIM system 14.

The CIM system 14 has an emergency response system (ERS) 78, and an equipment server 80 (tool application program 82). Additionally, the tool application program 82 provides a system log (not shown) that provides information such as indicated lots disposed within equipment, and disposed within bays that can help engineer to recover quickly from any seismic disturbance.

The ERS 78 is in communication with the voting logic device 18 and preferably, is in communication with the false alarm signal prevention device 56, and is in further communication with the ERC enabling switch 76. The equipment server (tool application program 82) is in operable communication with at least one piece of fabrication equipment 60 and in further operable communication with a material execution system 62.

Upon receiving the alarm triggering signal 54 from the voting logic device 18, the ERS 78 will signal the equipment server 80 (tool application program 82) to send a pause equipment command (not shown) to the at least one piece of fabrication equipment 60, and to send a hold lot command (not shown) to the MES 62 to hold operations from being performed on associated wafer lots being processed within the FAB, including, but not limited to holding lots being processed within a piece of fabrication equipment and disposed within a bay. The MES 62 capable of holding selected lots according to an associated Richter scale level detected. Additionally, the tool application program 82 has the capability of recording lot information into a system log (not shown) to determine location and status of paused or held lots during an earthquake.

As shown in FIG. 3, in an alternate preferred embodiment, a seismic emergency response system (SERS) 84 is provided. The SERS 84 of the present invention provides the capability to pause pieces of fabrication equipment and put wafer lots on hold lot according to different earthquake levels detected.

The SERS 84 has a FMCS 86 and a CIM system 88. The FMCS 86 has a plurality of seismic detection devices and at least one voting logic device 90.

The seismic detection devices are preferably seismometer groups 92, 94, 96, wherein each seismometer group 92, 94, 96 provides up to N number of seismometers for measuring a magnitude of an earthquake, and a plurality of set point device groups 98, 100, 102, wherein each set point device group 98, 100, 102 provides up to n number of set point devices associated with N number of seismometers within each seismometer group 92, 94, 96 for determining whether output signals communicated from each associated seismometer exceed a threshold value.

Each seismometer within a seismometer group 92, 94, 96 inputs signals indicating magnitudes of an earthquake and communicates magnitude value outputs to the seismometer's associated set point device within a set point device group 98, 100, 102, wherein the associated set point device within the set point device group 98, 100, 102 determines whether the magnitude value output signals of each seismometer within the seismometer group 92, 94, 96 exceed a threshold value. Each threshold value is equal to a magnitude value of an earthquake, preferably measured according to a Richter scale, wherein 1 is the lowest magnitude of an earthquake, and 9 typically, is the highest level of an earthquake. However, another earthquake magnitude or intensity scale could optionally be used.

Each set point device within a set point device group 98, 100, 102 is in communication with an associated seismometer within a seismometer group 92, 94, 96 and each set point device within a set point device group 98, 100, 102 could be disposed within an associated seismometer within a seismometer group 92, 94, 96 or could be disposed at another location within the FMCS 86.

Each set point device within a set point device group 98, 100, 102 preferably are calibrated to have the same threshold value, wherein when the threshold value for each of the set point devices a set point device group 98, 100, 102 is exceeded, a signal representing assertion of a set point device within the set point device group 98, 100, 102 is sent to the at least one voting logic device 90 indicating an earthquake having a Richter scale magnitude at least greater than the threshold value has occurred. For example, as shown in FIG. 3, three set point device groups are each associated with three seismometer groups 92, 94, 96 wherein each set point device group 98, 100, 102 has an associated threshold value indicating a magnitude on the Richter scale. Preferably, set point device group 98 has a threshold value of 2, set point group 100 has a threshold value of 3, and set point group 102 has a threshold value of 4.

The at least one voting logic device 90 inputs signals from the plurality of seismometer groups 92, 94, 96 and outputs a plurality of associated alarm triggering signals 104, 106, 108 to the CIM system 88. The FMCS 86 collects seismometer magnitude signals from each of the plurality of seismometer groups, and communicates the signals through the at least one voting logic device 90 to output the associated plurality of triggering signals 104, 106, 108 associated with each seismometer group 92, 94, 96 respectively which is then communicated to the CIM system 88.

The at least one voting logic device 90 prevents against seismometer failures by determining that at least three set point device threshold values associated with each set point device group within the plurality of set point device groups 98, 100, 102 have been exceeded. The voting logic device 90 then communicates the plurality of alarm triggering signals 104, 106, 108, each alarm triggering signal 104, 106, 108 associated with each set point group asserting the occurrence of an earthquake of a magnitude greater than the associated threshold value to the CIM system 88 if a seismometer failure within each seismometer group 92, 94, 96 has not occurred.

Figure 4:
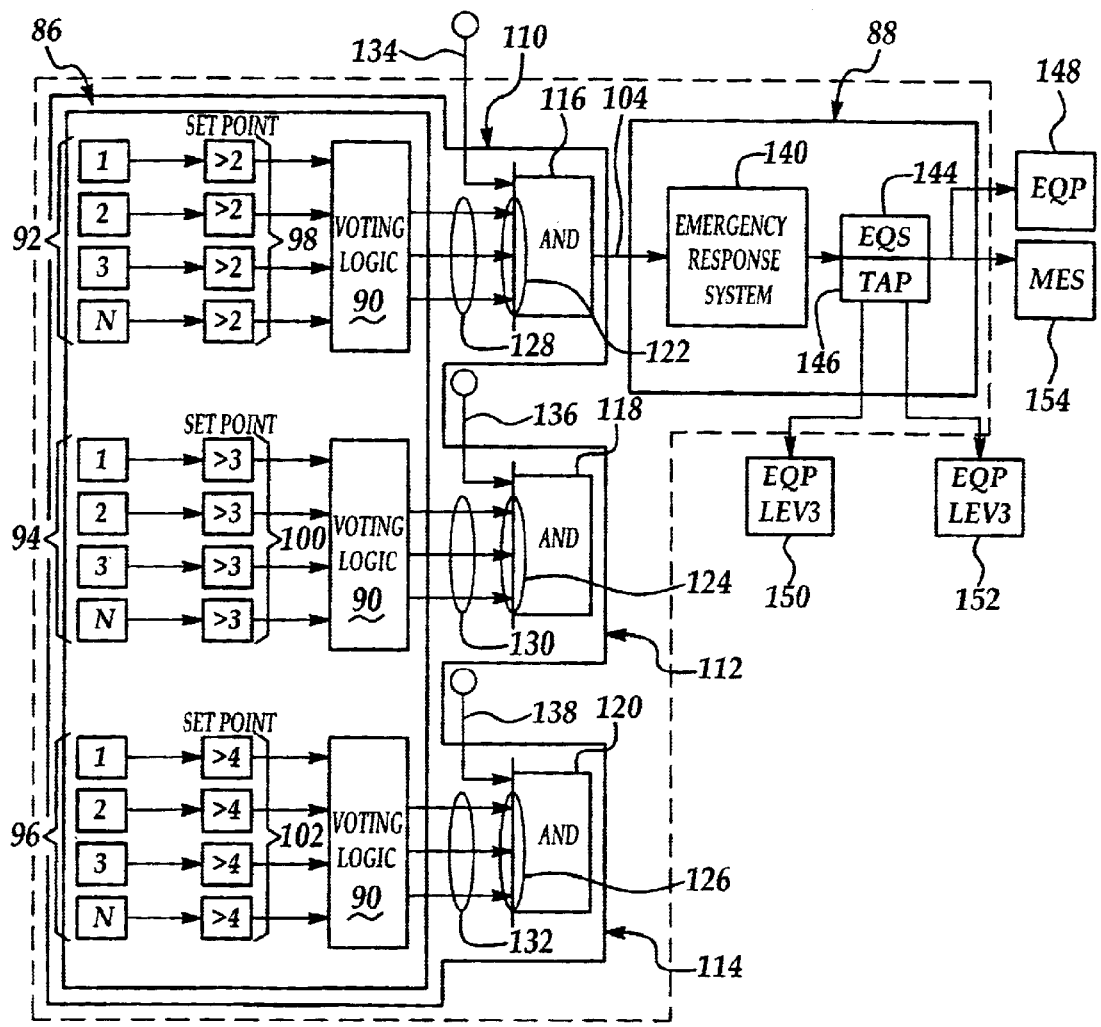
FIG. 4 is a schematic illustrating a seismic emergency response system having a plurality of seismic detection devices for detecting different magnitudes of earthquakes and a plurality of false alarm prevention devices in accordance with one embodiment of the present invention.

In operation, as shown in FIG. 3, when an earthquake having a magnitude greater than 2 but less than 3 is measured by the plurality of groups of seismometers, the voting logic device 90 communicates signals associated with the first set point device group 98, but not from the second or third set point device groups 100, 102 to the CIM system 88. When an earthquake having a magnitude greater than 3 but less than 2 is measured by the plurality of groups of seismometers, the voting logic device 90 communicates signals associated with the set point device groups 98 and 100, but not from the set point group 102 to the CIM system 88. Alternatively, when an earthquake having a magnitude greater than 4 is measured by the plurality of groups of seismometers, the voting logic device 90 communicates signals associated with each set point device group 98, 100, and 102 to the CIM system 88.

optionally, as shown in FIG. 4, the SERS 84 further provides a plurality of false alarm signal prevention devices 110, 112, 114, preferably three, to prevent against communication failure between the voting logic device 90 and the CIM system 88, and an emergency response center (ERC) to prevent the SERS 84 from disabling selective pieces of fabrication equipment 148, 150, 152 and from disabling an MES system 154.

In operation, each false alarm prevention device 110, 112, 114 has an associated AND gate 116, 118, 120, each AND gate 116, 118, 120 having preferably, three inputs 122, 124, 126 for receiving three redundant signal inputs 128, 130, 132 communicated from the plurality of associated alarm triggering signals 104, 106, 108 of the voting logic device 90 and one output for further communicating the plurality of associated alarm triggering signals 104, 106, 108 to the CIM system 88 when all three redundant signal inputs for an associated AND gate are asserted, and wherein when one of the three redundant signal inputs is not asserted, no alarm triggering signal will be sent to the CIM system 88.

Each of the three redundant signal inputs 128, 130, 132 associated with the plurality of alarm triggering signals 104, 106, 108 of the voting logic device 90 cooperate with an associated AND gate 116, 118, 120 to provide a plurality of false alarm signal prevention devices 110, 112, 114 for preventing against communication failure between the at least one voting logic device 90 and the CIM system 88.

Preferably, during a normal operating state wherein no earthquake is detected, if at least one of the plurality of redundant signal inputs 128, 130, 132 associated with each alarm triggering signal 104, 106, 108 is off, and thus, not asserted, then no earthquake alarm will be communicated to the CIM system 88. However, upon occurrence of an earthquake exceeding a threshold value associated with set point devices within any of the plurality of set point device groups 98, 100, 102, wherein each set point device group 98, 100, 102 is associated with a seismometer group 92, 94, 96, an associated alarm triggering signal is communicated to the CIM system 88 providing that all of the plurality of redundant signal inputs associated with the associated alarm triggering signals are on or are asserted.

The emergency response center (ERC) (not shown) has a plurality of ERC enabling switches 134, 136, 138 preferably three, capable of enabling or disabling the SERS 84 or a portion of the SERS 84 in accordance with instructions received from the ERC. Each enabling switch 134, 136, 138 is used by the ERC to enable or disable the SERS 84 by overriding the alarm triggering signal 104, 106, 108 communicated from an associated output of the at least one voting logic device 90. Each enabling switch 134, 136, 138 communicates an on or an off signal to an associated AND gate 116, 118, 120 of an associated false alarm signal prevention device 110, 112, 114 respectively, and selectively disables portions of the SERS 84 if an off signal is communicated to the associated AND gate 116, 118, 120 respectively.

For example, if an on signal from the first enabling switch 134 is communicated to the first AND gate 116 associated with Richter level greater than 2, and the redundant signal inputs 128 are asserted, thus indicating a Richter level greater than 2 but not greater than 3, then the first alarm triggering signal 104 indicating an earthquake having a magnitude greater than 2 is communicated to the CIM system 88. However, if an on signal from the second enabling switch 136 is communicated to the second AND gate 118 associated with a Richter level greater than 3, and each of the redundant signal inputs 128, 130 are asserted, thus indicating a Richter level greater than 3 but not greater than 4, then the second AND gate 118 communicates the second alarm triggering signal 106 indicating an earthquake having a magnitude greater than 3 to the CIM system 88. Also, the first alarm triggering signal 104 indicating an earth quake having a magnitude greater than 2 would be communicated each time that the second triggering signal 106 is communicated to the CIM system 88. Additionally, if an on signal from the third enabling switch 138 is communicated to the third AND gate 120 associated with Richter level greater 4, and each of the redundant signal inputs 128, 130, 132 are asserted, thus indicating a Richter level greater than 4, then the third AND gate 120 communicates the third alarm triggering signal 108 indicating an earthquake having a magnitude greater than 4 to the CIM system 88. Also, the first alarm triggering signal 104 indicating an earth quake having a magnitude greater than 2, the second alarm triggering signal 106 indicating an earthquake magnitude greater than 3 would be communicated to the CIM system 88 each time that the third triggering signal 108 indicating an earthquake having a magnitude greater than 4 is communicated to the CIM system 88.

The CIM system 88 has an emergency response system (ERS) 140, and an equipment server (tool application program).

The ERS 140 is in communication with the at least one voting logic device 90 and preferably, is in communication with the plurality of false alarm signal prevention devices 110, 112, 114, and is in further communication with each ERC enabling switch 134, 136, 138. The equipment server (tool application program) is in operable communication with a plurality of pieces of fabrication equipment and in further operable communication with a material execution system.

Upon receiving the at least one alarm triggering signal 104, 106, 108 selected from the group of the first alarm signal 102, the second alarm signal 106, and the third alarm signal 108 associated with an earthquake magnitude measured according to a Richter scale from the at least one voting logic device 90, the ERS 140 will signal the equipment server 144 having a tool application program 146 to send a pause equipment command (not shown) to an associated piece of fabrication equipment in accordance with an associated Richter level, and to send a hold lot command to the MES 154 to hold operations from being performed on associated wafer lots being processed within a FAB, including, but not limited to holding lots being processed within each piece of fabrication equipment 148, 150, 152 and disposed within a bay. The MES 154 capable of holding selected lots according to an associated Richter scale level detected. The ERS 140 uses logic to determine the Richter level for each alarm triggering signal 104, 106, 108 to turn off associated pieces of fabrication equipment 148, 150, 152 associated with a Richter scale level accordingly. Additionally, the tool application program 146 has the capability of recording lot information into a system log (not shown) to determine location and status of paused or held lots during an earthquake.

For example, as shown in FIGS. 3–4, if the first triggering signal 104 indicating an earthquake having a magnitude greater than 2 but less than 3 is communicated from the at least one voting logic device 90 to the ERS 140, the ERS 140 would signal the equipment server 144 (tool application program 146) to send a pause equipment command to each piece of fabrication equipment 148 that would be damaged during an earthquake having a magnitude greater than 2, however, each piece of fabrication equipment that would not be damaged during an earthquake having a magnitude greater than 2 but less than 3 would not be paused. Alternatively, if the second triggering signal 106 indicating an earthquake having a magnitude greater than 3 but less than 4 is communicated from the at least one voting logic device 90 to the ERS 140, the ERS 140 would signal the equipment server 144 (tool application program 146) to send a pause equipment command (not shown) to each piece of fabrication equipment 148, 150 that would be damaged during an earthquake having a magnitude greater than 3, however, all equipment 152 that would not be damaged during an earthquake having a magnitude greater than 3 but less than 4 would not be paused. Additionally, if the third triggering signal 108 indicating an earthquake having a magnitude greater than 4 is communicated from the at least one voting logic device 90 to the ERS 140, the ERS 140 would signal the equipment server 144 (tool application program 146) to send a pause equipment command to each piece of fabrication equipment 148, 150, 152 that would be damaged during an earthquake having a magnitude greater than 4, this would include all equipment that could be damaged during an earthquake having a lesser magnitude than 4.

From the foregoing, it should be appreciated that a system is provided for flexibly processing recipes within a wafer fabrication facility. While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A seismic emergency response system comprising:
a facility manager control system (FMCS) having
   a seismic detection device for detecting seismic activity, and
   a voting logic device for inputting signals from the seismic detection device and outputting an alarm triggering signal to a computer integrated manufacturing system;
a computer integrated manufacturing (CIM) system for receiving the alarm triggering signal output from the voting logic device, wherein the FMCS and the CIM system cooperate to control fabrication equipment and material flow within a wafer fabrication plant during an earthquake; and
a false alarm signal prevention device to prevent against communication failure between the seismic detection device and the CIM system.

2. The SERS of claim 1 wherein the seismic detection device of the facility manager control system comprises:
at least three seismometers for measuring a magnitude of an earthquake; and
at least three set point devices associated with the at least three seismometers for determining whether output signals communicated from each associated seismometer exceed a threshold value, the threshold value being calibrated the same for each of the at least three set point devices.

3. The SERS of claim 2, wherein each of the at least three seismometers receives inputs signals indicating magnitudes of an earthquake and communicates magnitude value outputs to each seismometer's associated set point device, and wherein the associated set point device determines whether the output signals of the seismometer exceed a threshold value.

4. The SERS of claim 3, wherein the threshold value for each set point device equals to a magnitude value of an earthquake measured according to a Richter scale, and
wherein when the threshold value for each of the at least three set point devices is exceeded, a signal representing assertion of the set point device is communicated to the voting logic device to indicate an earthquake having a Richter scale magnitude at least greater than the threshold value has occurred.

5. The SERS of claim 4 wherein the voting logic device comprises:
means for preventing against a seismometer failure, wherein the means for preventing against a seismometer failure determines that at least three set point device threshold values have been exceeded.

6. The SERS of claim 1 further comprising:
an emergency response center to prevent the SERS from disabling pieces of fabrication equipment and from disabling a material execution system.

7. The SERS of claim 6 wherein the false alarm prevention device comprises:
an AND gate, the AND gate having three inputs for receiving three redundant signal inputs from the alarm triggering signal communicated from the voting logic device and one output for sending the alarm triggering signal to the CIM system when all three input signals are asserted, and wherein when one of the three signal inputs is not asserted, no triggering signal will be sent to the CIM.

8. The SERS of claim 6 wherein the emergency response center comprises:
an enabling switch, the enabling switch capable of enabling or disabling the SERS in accordance with instructions received from the ERC.

9. The SERS of claim 6, wherein the CIM system comprises:
an emergency response system in operative communication with the group consisting of the voting logic device, the false alarm prevention device, and the ERC enabling switch; and
an equipment server, the equipment server in operable communication with at least one piece of fabrication equipment and in further operable communication with a material execution system.

10. A seismic emergency response system comprising:
a facility manager control system having
   a seismic detection device for detecting seismic activity
   a voting logic device for inputting signals from the seismic detection device and outputting an alarm triggering signal to a computer integrated manufacturing system;
an emergency response center having an enabling switch to prevent the SERS from disabling pieces of fabrication equipment and from disabling a MES system;
a computer integrated manufacturing system for receiving the alarm triggering signal output from the voting logic device, wherein the FMCS and the CIM system cooperate to control fabrication equipment and material flow within a wafer fabrication plant during an earthquake; and
a false alarm prevention device to prevent against communication failure between the seismic detection device and the CIM system.

11. The SERS of claim 10 wherein the false alarm prevention device comprises:
an AND gate, the AND gate having three inputs for receiving three redundant signal inputs from the alarm triggering signal communicated from the voting logic device and one output for sending the alarm triggering signal to the CIM system when all three input signals are asserted, and wherein when one of the three signal inputs is not asserted, no triggering signal will be sent to the CIM.

12. A seismic emergency response system comprising:
a FMCS having
   a plurality of seismic detection devices for detecting seismic activity, and
   at least one voting logic device for inputting signals from the plurality of seismometer groups and outputting a plurality of associated alarm triggering signals to a CIM system;
a computer integrated manufacturing system for receiving the plurality of associated alarm triggering signals output from the at least one voting logic device, wherein the FMCS and the CIM system cooperate to control fabrication equipment and material flow within a wafer fabrication plant during an earthquake; and
a plurality of false alarm signal prevention devices to prevent against communication failures between the plurality of seismic detection devices and the CIM system.

13. The SERS of claim 12 wherein the plurality of seismic detection devices of the facility manager control system comprises:
- a plurality of seismometer groups, wherein each seismometer group provides at least three seismometers for measuring a magnitude of an earthquake; and
- a plurality of set point device groups, wherein each set point device group provides at least three set point devices associated with the at least three seismometers in a seismometer group for determining whether output signals from each associated seismometer exceed a threshold value.

14. The SERS of claim 13, wherein each of the at least three seismometers within each seismometer group receives inputs signals indicating magnitudes of an earthquake and communicates magnitude value outputs to each seismometer's associated set point device, and
- wherein the associated set point device determines whether the output signals of each seismometer within a seismometer group exceed a threshold value, the threshold value being calibrated the same for each of the at least three set point devices within a set point device group.

15. The SERS of claim 14, wherein the calibrated threshold value for each of the at least three set point devices within each set point group equals a magnitude value of an earthquake measured according to a Richter scale, and
- wherein when the calibrated threshold value associated with each of the at least three set point devices within a set point group is exceeded, a signal representing assertion of each of the at least three set point devices within a set point group is communicated from each of the at least three set point devices to the at least one voting logic device to indicate an earthquake having a Richter scale magnitude at least greater than the threshold value has occurred.

16. The SERS of claim 12 further comprising:
- an emergency response center to prevent the SERS from disabling pieces of fabrication equipment and an MES system.

17. The SERS of claim 12 wherein each of the false alarm prevention devices comprises:
- an AND gate, the AND gate having three inputs for receiving three redundant signal inputs from each of the plurality of associated alarm triggering signals communicated from the voting logic device and one output for sending each of the plurality of associated alarm triggering signals to the CIM system when all three input signals are asserted, and wherein when one of the three signal inputs is not asserted, no associated alarm triggering signal will be sent to the CIM.

18. The SERS of claim 17 wherein the emergency response center comprises:
- a plurality of enabling switches, the enabling switches capable of enabling or disabling the SERS in accordance with instructions received from the ERC.

19. The SERS of claim 18, wherein the CIM system comprises:
- an emergency response system in operative communication with the group consisting of the at least voting logic device, the plurality of false alarm prevention devices, and the plurality of ERC enabling switches; and
- an equipment server, the equipment server in operable communication with a plurality of pieces of fabrication equipment and in further operable communication with a material execution system.

20. The SERS of claim 9, wherein the application server comprises a tool application program that records wafer lot information into a system log, wherein the wafer lot information is selected from a wafer lot location and a wafer lot status.

* * * * *